June 29, 1943.  L. E. KREBS  2,322,853
METHOD OF AND APPARATUS FOR TESTING COILS
Filed June 28, 1941
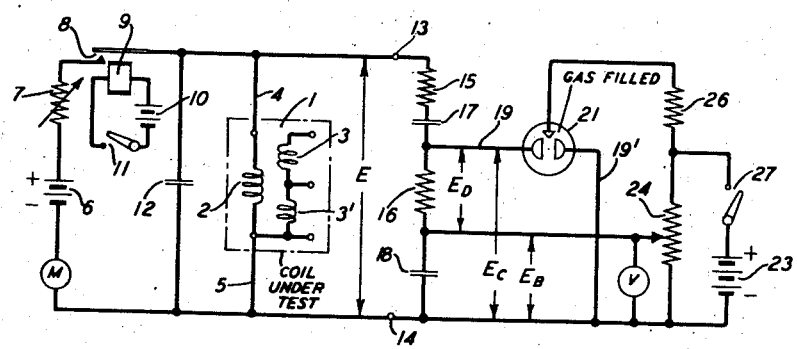
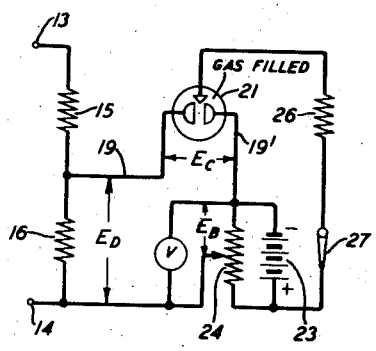
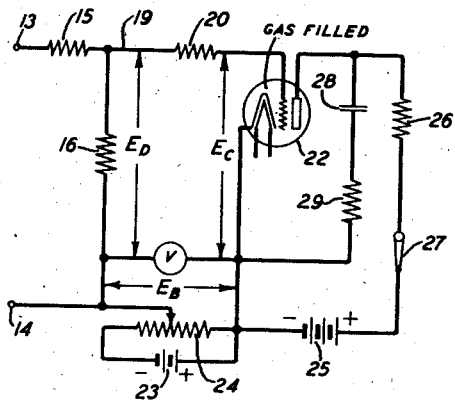
INVENTOR
L. E. KREBS
BY
G. H. Heyott
ATTORNEY Patented June 29, 1943

2,322,853

UNITED STATES PATENT OFFICE 2,322,853

METHOD OF AND APPARATUS FOR TESTING COILS

Luther E. Krebs, West Orange, N. J., assignor to Bell Telephone Laboratories, Incorporated, New York, N. Y., a corporation of New York Application June 28, 1941, Serial No. 400,292

4 Claims. (Cl. 175—183)

This invention relates to a method of and an apparatus for testing for shorted turns in electrical coils.

Electrical coils frequently have defective insulation on one or more turns of their windings resulting either in shorted turns or in a condition which is very apt to result in shorted turns in actual use. A positive disclosure of this defective insulation is sometimes difficult to obtain, particularly where the defect is latent. In testing coil wound telephone apparatus, for example, induction coils, it is very desirable to ascertain with certainty and rapidity the condition of the windings before placing the apparatus in service. This is of particular importance when making recovery inspections of used apparatus.

It is therefore the object of this invention to provide a method of and an apparatus for testing for shorted turns in electrical coils.

The foregoing object is attained by this invention by providing a method of and an apparatus for passing a continuous electric current through at least one of the windings of the coil to be tested, suddenly interrupting the current and observing the magnitude of the voltage induced in at least one of the coil windings by the collapsing magnetic field.

The invention may be better understood by referring to the accompanying drawing in which:

Fig. 1 discloses a preferred embodiment of applicant's invention;

Fig. 2 discloses a modified form of the detection circuit; and

Fig. 3 discloses another modification of the detection circuit employing a hot cathode gas-filled tube.

Referring now more particularly to Fig. 1, reference numeral 1 denotes generally a coil under test having one or more windings. In the specific form herein disclosed only three windings, 2, 3 and 3', are shown. These windings are shown conductively interconnected but this is not necessary for the practice of this invention. The coil has been shown with this connection because it represents schematically an actual standard telephone induction coil commonly coded as the 101—A induction coil. Either winding 2, winding 3 or winding 3' or any combination thereof may be selected as the energizing winding for the passage of the magnetizing current. In Fig. 1 coil 2 has been selected for the passage of the magnetizing current through conductors 4 and 5 from battery 6. A rheostat 7 and milliammeter M are provided for adjusting the magnitude of this test current. The circuit is completed from battery 6 to winding 2 by means of a magnetic switch 9. A manually operated switch 11 completes a circuit through the coil of magnetic switch 9 and battery 10 thereby closing contacts 8 of magnetic switch 9. Contacts 8 are preferably mercury contacts, although not necessarily so, and are magnetically operated to provide consistent breaking of the circuit through winding 2.

When manual switch 11 is closed, magnetic switch 9 operates to close the circuit through winding 2 thereby building up a magnetic field in the magnetic circuit mutually linking all of the windings of the coil 1 under test. When manual switch 11 is subsequently opened, contacts 8 of magnetic switch 9 open the circuit through the winding 2 thereby causing the magnetic field mutually linking the windings of the coil 1 to suddenly collapse and generate a voltage E between terminals 13 and 14. This voltage is preferably made oscillatory at a frequency somewhat lower than the natural resonant frequency of the coil with its distributed capacitance by means of a condenser 12 connected across one or more of the coil windings. In Fig. 1 it is shown connected across winding 2. Winding 2 is also shown connected to terminals 13, 14, but either of the windings 3 or 3' or a combination thereof could be so connected.

For a given magnetizing current flowing through coil 2, the peak induced voltage E induced between terminals 13 and 14 will reach a relatively high value providing there are no shorted turns in any of the windings of the coil under test. However, should there be one or more shorted turns in any one of the windings of the coil under test, the peak induced voltage E will attain a very much lower value. It has been found that should any of the windings of the coil have defective insulation between turns there is a similar reduction in the induced voltage E. If the defect be one of low insulation resistance the flow of current therethrough causes the induced voltage to be damped. If the defect be one of low dielectric strength, the induced voltage arcs through it to dissipate energy and thereby lower the induced voltage. As all of the windings of coil 1 are inductively coupled to the energizing winding 2, a short circuit or other defective insulation between any of the turns of any of the windings will have essentially the same effect of reducing the peak induced voltage E. In the appended claims where reference is made to shorted turns it is intended to include turns which are partially shorted by defective insulation which results in a lowered induced voltage in the windings.

The peak induced voltage E occurring between terminals 13 and 14 is observed in Fig. 1 by means of a cold cathode gas-filled tube 21. The circuits are so arranged that should the voltage E reach a predetermined limit, tube 21 will be caused to discharge and remain luminous. Power is supplied to the anode of tube 21 from direct current source 23 by way of switch 27 and series resistor 26. The induced voltage E appearing at terminals 13 and 14 is impressed upon the control gap electrodes of tube 21 by means of potentiometer resistors 15 and 16 and direct current blocking condensers 17 and 18. The discharge voltage $E_D$ appearing across resistor 16 and the bias voltage $E_B$ are impressed upon the control gap electrodes of tube 21 by way of conductors 19 and 19'.

The polarities of direct current power sources 6 and 23 are so selected and the connections of the circuits are so arranged as to cause the first half cycle of discharge voltage $E_D$ appearing across resistor 16 to be in opposition to the bias voltage $E_B$ provided by potentiometer 24. The actual control gap voltage $E_c$ appearing across the control gap electrodes is thereby made too small to cause tube 21 to operate. However, during the second half cycle, the direction of the discharge voltage $E_D$ acts in the same direction as the bias voltage $E_B$. Should this discharge voltage $E_D$ during the second half cycle be large enough, the resultant control gap voltage $E_c$ will cause tube 21 to discharge. Although any half cycle of the discharge voltage could be used, the second half cycle is preferred rather than the first because the damping due to the defect has had more time to act to produce a greater absolute change in voltage, and as succeeding half cycles fall off rapidly in magnitude they are less practical to detect with a simple indicating circuit.

The above-described circuit may be calibrated for proper operation by first experimentally determining the proper induced voltage limit E during the second half cycle for the particular type of coil to be tested. The effective discharge voltage $E_D$ appearing across resistor 16 will then be defined by Equation (1):

$$E_D = KE \qquad (1)$$

where $$K = \frac{R_{15}}{R_{15}+R_{16}}$$

E=induced voltage limit for second half cycle.
$R_{15}$, $R_{16}$=resistances of resistors 15 and 16.

The slider of potentiometer 24 is then adjusted until tube 21 breaks down whereupon the voltage read by voltmeter V is the breakdown control voltage $E_c$ of tube 21. The slider of potentiometer 24 is then readjusted until voltmeter V reads voltage $E_B$ as defined by Equation (2):

$$E_B = E_C - E_D \qquad (2)$$

where $E_B$=bias voltage read by meter V.
$E_c$=breakdown control voltage of tube 21.

With the circuit adjusted as described above, a coil 1 to be tested is connected to the circuit by way of conductors 4 and 5. Switches 27 and 11 are closed. Switch 11 is then opened to cause the generation of the induced voltage E as previously described. Should the second half cycle of this voltage be large enough to cause the sum of the voltages $E_D$ and the bias voltage $E_B$ to equal or exceed the breakdown voltage $E_c$ of tube 21, tube 21 will discharge indicating that coil 1 is satisfactory. The circuit may be restored for a second test by momentarily opening switch 27 thereby extinguishing tube 21.

The detection circuit shown in Fig. 2 differs from that of Fig. 1 in that the direct current blocking condensers 17 and 18 have been eliminated and the bias circuit rearranged. This circuit operates in essentially the same manner as described for Fig. 1 and may replace the detection circuit of Fig. 1 by connecting its terminals 13 and 14 to the terminals 13 and 14 shown in Fig. 1.

The circuit of Fig. 3 also operates essentially like the circuit of Fig. 1. However, in this case the gas-filled tube 22 has a hot cathode and is therefore inherently more sensitive. A current limiting resistor 20 is inserted in the grid circuit of this tube. Battery 23 is used only for producing the bias voltage $E_B$ and a separate voltage source 25 is supplied for the anode circuit. Condenser 28 and resistance 29 are serially connected between the anode and the cathode to stabilize the action of the tube.

As all three of these detection circuits operate in essentially the same way, the mathematical expressions given above in connection with the description of Fig. 1 apply to Figs 2 and 3 as well.

Instead of depending upon the discharge glow of tube 21 in Figs. 1 and 2 or tube 22 in Fig. 3, resistor 26 in all three figures may be a relay winding associated with any suitable audible or visible signal or may itself be a lamp of suitable resistance mounted in a convenient location.

What is claimed is:

1. The method of testing for shorted turns in an electric coil having at least one winding comprising the step of establishing a magnetic field mutual to all windings, collapsing the field to induce oscillatory voltages in all of the windings, and observing the magnitude of the voltage induced in one of the windings during a selected one of its half cycles.

2. The method of testing for shorted turns in an electric coil having at least one winding comprising the step of establishing a magnetic field mutual to all windings, collapsing the field to induce oscillatory voltages in all of the windings, and observing the magnitude of the voltage induced in one of the windings during its second half cycle.

3. An apparatus for testing for shorted turns in an electric coil having at least one winding comprising a direct current source of electric energy including circuits for passing a continuous electric current therefrom through at least one of the coil windings to establish a steady magnetic field mutual to all the coil windings, an interrupter for suddenly interrupting the current to induce oscillatory voltages in all of the coil windings, and an indicator connected to at least one of the coil windings responsive to the voltage of a selected half cycle greater than a predetermined minimum magnitude.

4. An apparatus for testing for shorted turns in an electric coil having at least one winding comprising a direct current source of electric energy including circuits for passing a continuous electric current therefrom through at least one of the coil windings to establish a steady magnetic field mutual to all the coil windings, an interrupter for suddenly interrupting the current to induce voltages in all of the coil windings, a condenser connected to the coil windings to render the induced voltages oscillatory at a frequency lower than the natural resonance of the coil without the condenser, and an indicator connected to at least one of the coil windings responsive to the voltage of a selected half cycle greater than a predetermined minimum magnitude.

LUTHER E. KREBS.